April 13, 1926.
H. L. SHARLOCK ET AL
DEMONSTRATING APPARATUS
Filed March 28, 1925
1,580,222
2 Sheets-Sheet 1
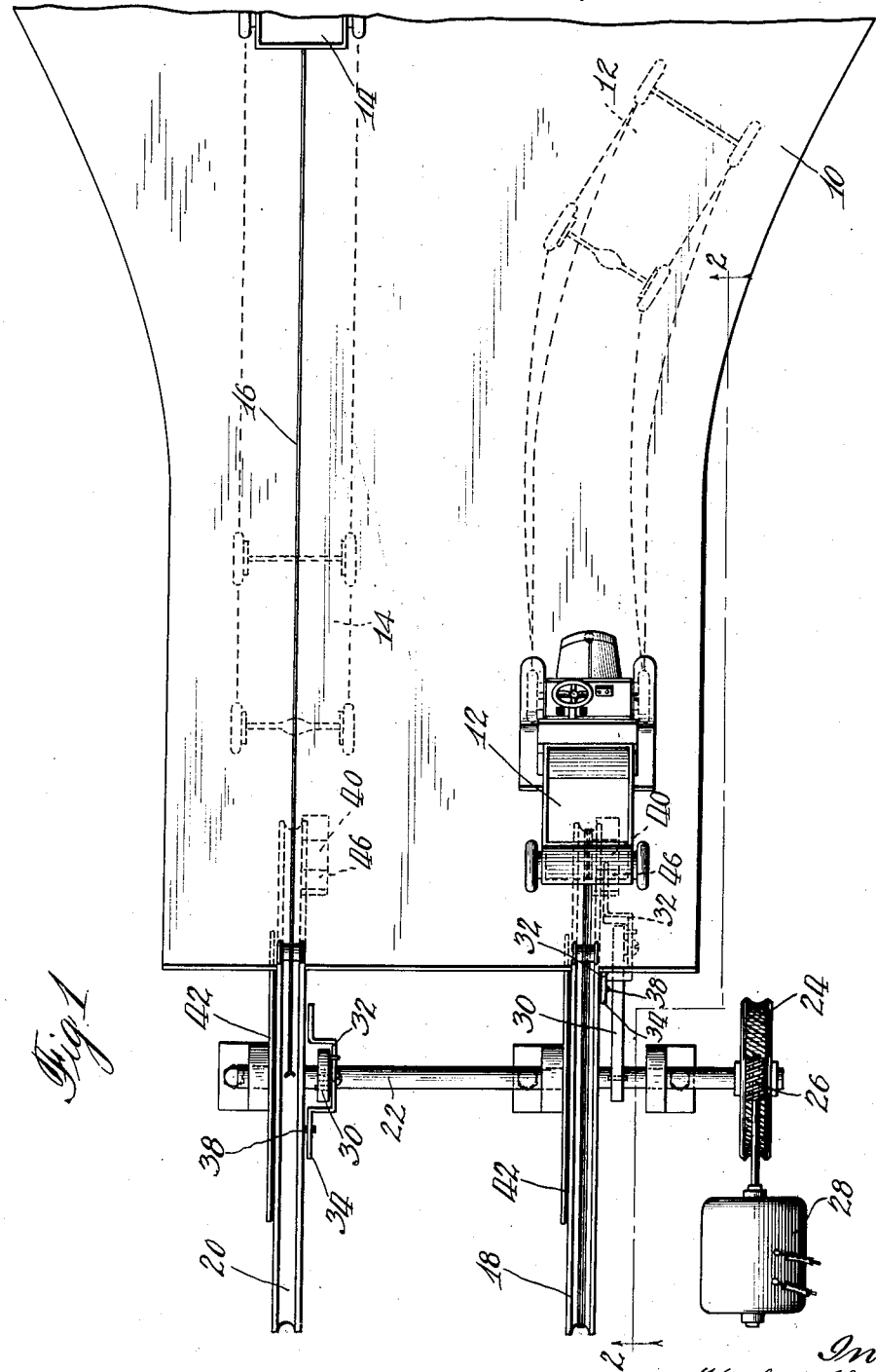
Inventors.
Herbert L. Sharlock.
Montgomery W. McConkey.
By: M. W. McConkey
Atty.

April 13, 1926.
H. L. SHARLOCK ET AL
DEMONSTRATING APPARATUS
Filed March 28, 1925
1,580,222
2 Sheets-Sheet 2
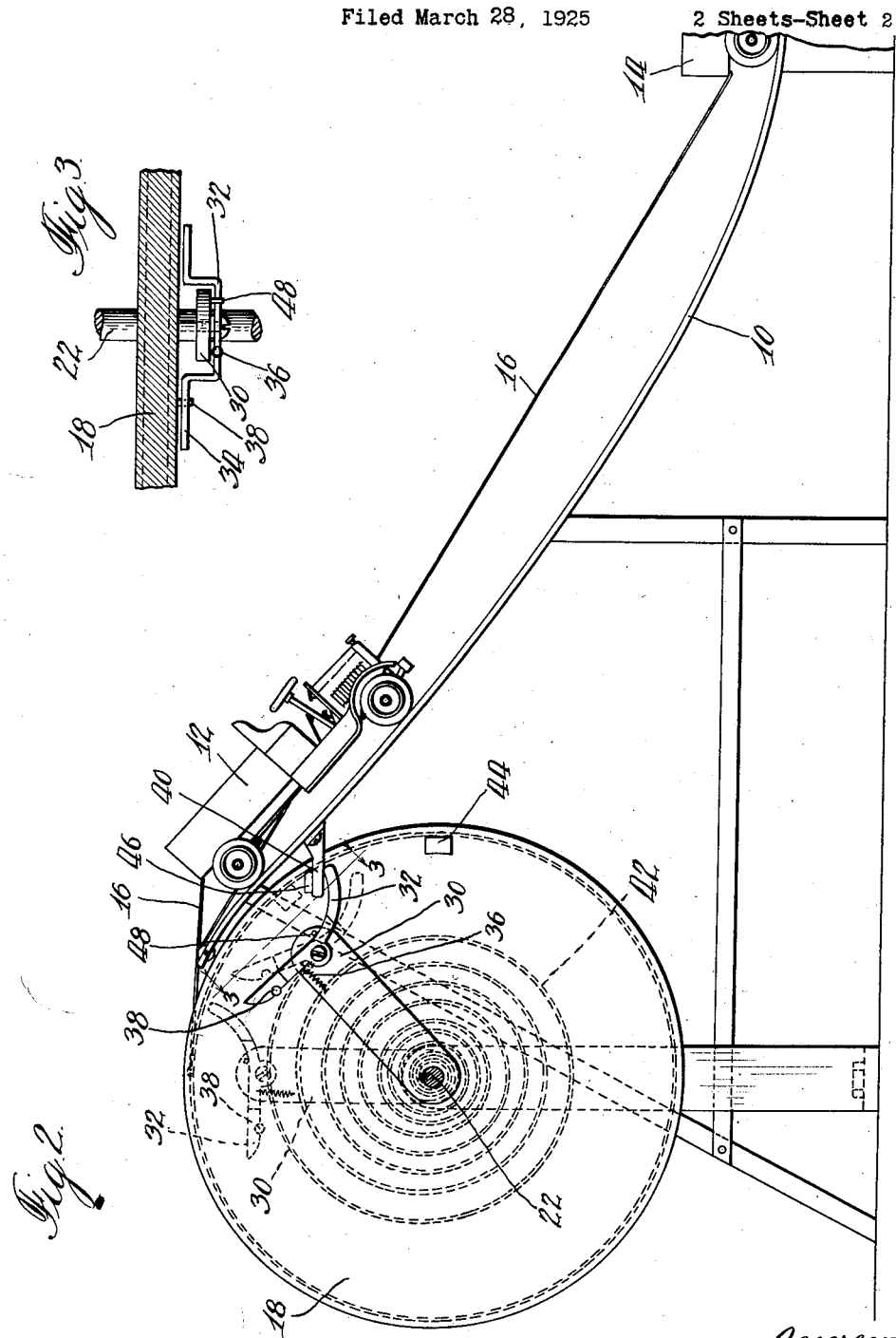

Patented Apr. 13, 1926.

1,580,222

UNITED STATES PATENT OFFICE.

HERBERT L. SHARLOCK, OF CHICAGO, ILLINOIS, AND MONTGOMERY W. McCONKEY, OF FERNDALE, MICHIGAN, ASSIGNORS TO BENDIX BRAKE COMPANY, OF CHICAGO, ILLINOIS, A CORPORATION OF ILLINOIS.

DEMONSTRATING APPARATUS.

Application filed March 28, 1925. Serial No. 19,090.

*To all whom it may concern:*

Be it known that we, HERBERT L. SHARLOCK and MONTGOMERY W. McCONKEY, citizens of the United States, and residents, respectively, of Chicago, Cook County, Illinois, and of Ferndale, Oakland County, Michigan, have invented certain new and useful Improvements in Demonstrating Apparatus, of which the following is a specification.

This invention relates to apparatus for demonstrating the movement of vehicles, under the influence of brakes or the like, and is illustrated as embodied in automatically-operating apparatus for contrasting the effect of four wheel brakes with the effect of rear wheel brakes only. An object of the invention is to provide simple mechanism, suitable for use in demonstrations in show windows and the like, which is reliable and will operate indefinitely to move one or more vehicles up to the end of a track and then permit them to coast down again.

Having this in mind, the invention may be regarded as comprising the combination, with the vehicle, of mechanism for moving it to the end of the track and then causing it to be projected along the track, to demonstrate the effect of the brakes or the like. Preferably the effect of contrast is secured by using two or more differently-arranged vehicles, herein shown as operating alternately. Usually one of the vehicles will be equipped with four wheel brakes and the other with rear wheel brakes only, although the effect of the demonstration may be heightened by adding other vehicles with front wheel brakes only, with one front and one rear brake on the same side, and with one front and one rear brake on opposite sides. In all cases, except that of rear wheel brakes only, the vehicle will move substantially in a straight line, no matter how much the track may be greased or waxed, although of course the vehicle with brakes on all four wheels will stop much sooner than the others. The vehicle having rear wheel brakes only will, as is well known, skid and swing crosswise on the greased track, thus proving that this customary arrangement of the brakes is the most dangerous possible, as well as much less efficient than the four wheel brakes.

In the embodiment shown in the drawings, the automatic mechanism pulls the vehicles to the top of an inclined track, and then releases them, to allow them to coast down by gravity.

The above and other objects and features of the invention, including various novel combinations of parts and desirable particular constructions, will be apparent from the following description of one illustrative embodiment shown in the accompanying drawings, in which:

Figure 1 is a top plan view of the apparatus, with one vehicle up and the other down;

Figure 2 is a vertical section on the line 2—2 of Figure 1, showing the track and one pulley in side elevation; and Figure 3 is a section on the line 3—3 of Figure 2, showing the latch connecting the pulley to its drive shaft.

In the arrangement selected for illustration, the apparatus comprises an inclined track 10, preferably well greased, and two or more vehicles 12, 14, which may be equipped, for example, with four wheel brakes and with rear wheel brakes respectively, as indicated in the dotted-line views of the vehicles in Fig. 1. Each vehicle is connected by a cord 16 to one of two pulleys 18 and 20 freely rotatable on a shaft 22 crossing the end of the track. Shaft 22 is shown driven continuously by a worm wheel 24 and a worm 26 on the armature shaft of an electric motor 28. Except for the timing, the operation of the pulleys 18 and 20 is the same.

Adjacent each pulley is an arm 30 turning with the shaft, and carrying a pivoted latch 32 having a notched and offset end (Fig. 3) 34 held by a spring 36 in driving engagement with a pin 38 projecting from the adjacent pulley 18 or 20. The opposite end of the latch 32 is also offset toward the pulley, as appears in Fig. 3, and extends outwardly away from the shaft (Fig. 2) to be tripped, when the vehicle reaches the top of the track, by a stop 40 secured to the track. In order to avoid the drag of the pulley 18 or 20 on the vehicle as it coasts down the track, which might affect its movements, each pulley has a helical spring 42 connected at its inner end to one of the bearings of the shaft 22 and at its outer end to the pulley. When latch 32 is released, spring 42 turns the pulley backward, until a projecting part 44 engages a rubber bumper 46 on the back of stop 40. Latch 32 is during this idle period held by spring 36 and a stop pin 48 in such a position that, when it comes around again, it cams itself over the pin 38, whereupon the pulley is again turned against the resistance of its spring 42, to wind up the cord 16 and pull the vehicle back up the track. The two pulleys are preferably timed to release the vehicles alternately.

The vehicle 14, when released, will coast straight down the incline, as shown in dotted lines in Fig. 1, whereas vehicle 12, which has rear brakes only, will ordinarily "skid" or swerve to one side as shown in dotted lines in Fig. 1.

While one embodiment of the invention has been described in detail, it is not our intention to limit its scope to that particular embodiment, or otherwise than by the terms of the appended claims.

We claim:

1. Demonstrating apparatus comprising, in combination, an inclined track, a pair of vehicles having differently-arranged brakes, and mechanism operating to move first one and then the other of said vehicles to the top of the track and then release it.

2. Demonstrating apparatus comprising, in combination, an inclined track, a pair of vehicles having differently-arranged brakes, and mechanism operating to pull said vehicles up the track and arranged automatically to permit them to coast down again to demonstrate the action of the brakes.

3. Demonstrating apparatus comprising, in combination, an inclined track, a pair of vehicles having differently-arranged brakes, a cord secured to the rear of each vehicle, mechanism to wind up the cords to pull the vehicles to the top of the track and means to release the vehicles from the pull of said mechanism to permit them to coast down the track to demonstrate the action of the brakes.

4. Apparatus as defined by claim 3, in combination with springs arranged to reverse the winding parts of the mechanism to relieve the vehicles from the drag thereof in coasting down the track.

5. Demonstrating apparatus comprising, in combination, a track, a vehicle equipped with brakes, and means for alternately causing the vehicle to be projected along the track and then to pull it back without interfering with lateral skidding, to demonstrate the action of the brakes.

6. Demonstrating apparatus comprising, in combination, an inclined track, a vehicle, and mechanism operating automatically alternately first to pull the vehicle to the top of the track and then to permit it to coast down without interfering with lateral skidding.

7. Demonstrating apparatus comprising, in combination, an inclined track, a vehicle, a power-driven shaft, and mechanism alternately driven by the shaft and released therefrom and operative when driven by the shaft to pull the vehicle to the top of the track.

8. Demonstrating apparatus comprising, in combination, an inclined track, a vehicle, a power-driven shaft, a pulley loose on the shaft, a cord connected to the pulley and to the vehicle and arranged when wound on the pulley to pull the vehicle up the track, and means for connecting the pulley to the shaft for part of each revolution and then releasing it.

9. Demonstrating apparatus comprising, in combination, a track, a vehicle on the track, a power-driven shaft across the end of the track, a pulley loose on the shaft, a cord connecting the pulley and vehicle and arranged when wound on the pulley to pull the vehicle to the end of the track, an arm revolving with the shaft, a latch for effecting a driving connection between the arm and the pulley, and means for periodically tripping the latch to release the pulley.

In testimony whereof we have hereunto signed our names.

HERBERT L. SHARLOCK.
MONTGOMERY W. McCONKEY.